BEST AVAILABLE COPY

DEFENSIVE PUBLICATION T856,041

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1019

598,013

THREAD SPOOL AND METHOD OF MANUFACTURE BY BLOW MOLDING

Gerard V. Delaire, % Tennessee Eastman Company, P.O. Box 511, Kingsport, Tenn. 37662

Filed Nov. 30, 1966. Published Nov. 26, 1968

Class 242—118.7

2 Sheets Drawings. 16 Pages Specification

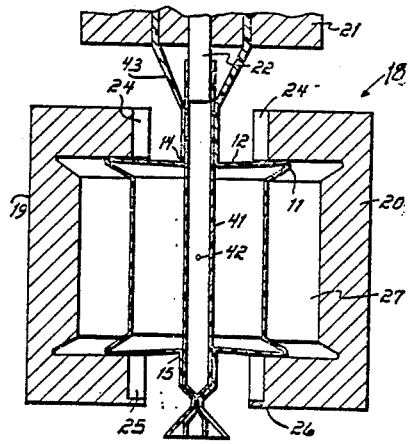

A thermoplastic spool formed of a hollow barrel having rimmed ends integral with and located at opposite ends thereof, a core tube disposed between and secured to the rimmed ends and located axially within the barrel. The hollow spool is formed by placing a core tubing having air exit holes therein between mold halves in a mold cavity, extruding a softened thermoplastic tube axially around the core tubing, bringing the mold halves together and sealing the ends of the outer tube and one end of the core tube, introducing a fluid under pressure into the core tube which passes through the exit holes therein into the outer tube forcing it into the shape of the mold, cooling the thus formed hollow spool and removing it from the mold. Alternatively, the core tubing may be formed simultaneously with the outer tube by extruding a softened thermoplastic material about a sizing mandrel. In this alternative embodiment, the outer tube is blown to its final shape by inserting a blowing needle through the outer tube.

United States Patent Office

PTO - BOYERS, PA Duty Station

MISSING PAGE TEMPORARY NOTICE

PATENT # T856041 FOR ISSUE DATE 11-26-1968 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheets 1 & 2

N/A at Boyers
6-1-94

Data Conversion Operation

Boyers, Pa